May 20, 1958 P. S. ALLEN 2,835,344
SPRING ACTUATED MOTORS
Filed Aug. 28, 1956
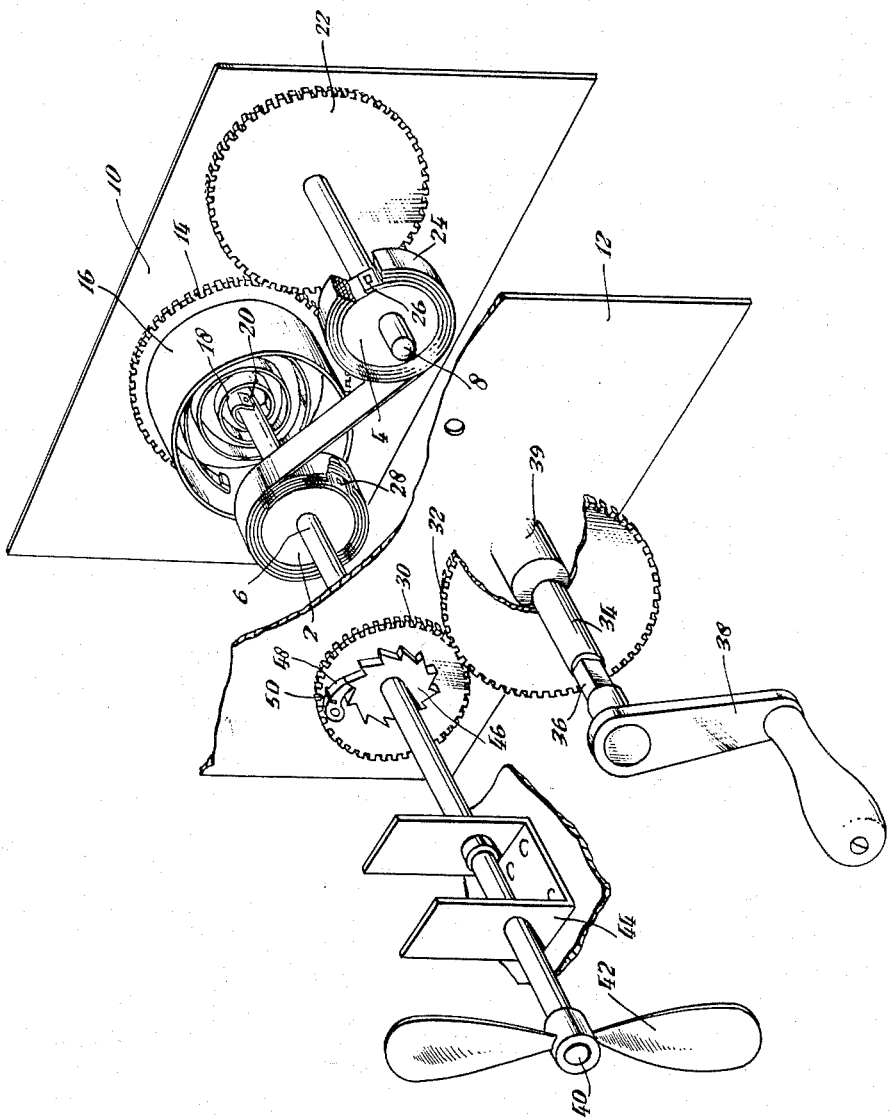
Inventor
PETER STANLEY ALLEN
By Albert H Jacobs
Attorney

United States Patent Office 2,835,344
Patented May 20, 1958

2,835,344

SPRING ACTUATED MOTORS

Peter Stanley Allen, Ickenham, England, assignor to Hendrey Relays Limited, Slough, England Application August 28, 1956, Serial No. 606,735

Claims priority, application Great Britain August 29, 1955

2 Claims. (Cl. 185—37)

This invention relates to coiled spring motors of the kind wherein energy is stored in the spring by winding.

In existing coiled spring motors the spring is of flat section which when free or unstressed is loosely spiral and which becomes wound or stressed by turning a shaft to thereby tighten the coils of the spring. Upon releasing the shaft to permit unwinding of the spring, the torque output decreases from a maximum and unevenly as the spring unwinds. Because a constant torque output is required, for many purposes, these coiled spring motors are unsatisfactory. Moreover, an uneven torque output is very wasteful, uneconomical and inefficient.

It has been proposed to improve the efficiency in coiled spring motors by mounting two drums side by side on a plate. According to this proposal, a coil spring was attached at one end and extended spirally around one of the drums so that any stresses in the spring were then relieved. The other end of the spring was secured to the second drum so that the run between the ends of the spring extended tangentially with and between alternate faces of said drum. Thus, the coils of this spring became turned inside out as they were wound on the second drum. The spring was then stressed by rotating the second drum until all the coils of the spring had been taken off the first drum and transferred on to the second drum. On releasing the wound spring the two drums would tend to rotate so that all of the coils of the spring ran back on to the first drum and in so doing the torque output was produced at the shaft of the second drum.

A model constructed in accordance with this proposed structure was made but the following expected advantages proved to be purely theoretical so that this proposed structure was never put into practical use. One of the theoretical advantages of this structure was that with proper proportioning between the diameters of the two drums the output torque at the shaft of the second drum would be substantially constant and with a nearly flat characteristic over the whole length of the run of the spring.

Another of the theoretical advantages of this structure was that by design it was possible upon winding to strain all the parts of the spring up to the elastic limit so that it should therefore have been possible to store approximately one and a half times as much useful energy per unit volume of spring than could be stored when the spring was instead used in conventional spring motors.

These theoretical advantages were unsupported and it was further found that the spring would not run back from the second drum on to the first drum in a nice tightly wound coil. Due to this result, the spring in the model would occupy a very much greater overall volume than would be expected and this rendered the output of the motor very erratic because of variation in the shape of the coils occurring as the spring was rewound on to the first drum.

Therefore, it was further proposed to modify this structure by stress relieving the spring so that its smaller coils have a diameter normally smaller than the diameter of the storage drum whereby the spring when wound on the storage drum would never become fully unstressed and would always be subject to residual stress. In the model, this was found to result in a decrease in the amount of energy or power which would be delivered by the motor.

According to the present invention, a spiral coiled spring motor is provided with tensioning means independent from the motor spring to maintain a tension within the motor spring. This tension is such as to regulate the formation of the coils so that they remain tight and without detracting substantially from the energy output or power of the motor.

The figure of the drawing illustrates diagrammatically in an exploded perspective view an embodiment of a spring motor made in accordance with the present invention.

In the drawing the spring motor comprises a power drum 2 and a storage drum 4 of equal diameters rotatably mounted on parallel shafts 6 and 8 which are respectively journalled in movement plates 10 and 12. The plate 12 in the drawing is partly cut-away in order to show the mechanism constructed in accordance with the invention. A large diameter spur gear 14 is mounted on the shaft 6 and is free to rotate thereon. The gear 14 carries on its face a spring barrel 16 for housing the tensioning spring 18, one end of which is secured to the barrel 16. The other end of spring 18 is secured to a spring hook 20 on the shaft 6 so that the spring 18 is tensioned by turning the sprocket 14 on the shaft 6 relative to power drum 2. A second large diameter spur gear 22 of diameter equal to that of the sprocket 14 is mounted on the shaft 8 and in the same plane with the sprocket 14 and meshing therewith. The spur gear 22 is attached for rotation with shaft 8. A main spring 24 is secured at one end to a spring hook 26 on drum 4 and at the other end to a spring hook 28 on the drum 2.

Shaft 6 protrudes through movement plate 12 and carries a first gear 30 meshing with second gear 32 on axle 34. Axle 34 is provided with a squared end 36 adapted to be engaged by a key handle 38. Axle 34 is carried by a bearing 39 extending in the plate 12. A propeller blade 40 is carried by an axle 42 journalled in bracket 44. Axle 42 carries a ratchet wheel 46 which is adapted to be engaged by a pawl 48 mounted on the spur gear 30 and pressed into engagement with the teeth of ratchet wheel 46 by spring 50. It is noted that ratchet wheel 46 and spur gear 30 are in face to face engagement and coaxial although secured on different axles or shafts.

In operation: The spring motor is wound by engaging the key handle 38 within the squared end 36 of axle 34 and then rotating key handle 38 in the clockwise direction. Main spring 24 is thus unwound from the storage drum 4 and wound on to the power drum 2. The propeller 40 remains substantially stationary during this winding because the ratchet 48 slides over the teeth of ratchet wheel 46. Power is derived from the motor by disengaging key handle 38 from axle 34 so that main spring 24 winds back on to the storage drum 4 to rotate axle 42 due to engagement of pawl 48 with the teeth of ratchet wheel 46. During this winding the tensioning spring 18 operates to maintain a constant slight tension in the main spring 24. Thus, tensioning spring 18 tends to rotate large spur gear 14 relatively to shaft 6 and because large spur gear 14 is in mesh with second spur gear 22 a slight torque is also applied to shaft 8 in the direction opposite to the torque applied to the shaft 6 which tensions slightly the main spring 24 to thereby maintain the coils of the main spring 24 tightly wound and lightly tensioned.

It is understood that the coils of main spring 24 when manufactured have been relieved of any stresses therein so that they will normally lie snugly and tightly on storage drum 4.

Although a single embodiment of a device constructed in accordance with the invention has been disclosed and shown in the drawing it is to be understood that this same device is capable of further modifications within the scope of anyone skilled in the art.

What is claimed is:

1. A coiled spring motor for producing a constant torque output including a pair of substantially parallel shafts provided with power and storage drums respectively secured to one of said shafts, a spiral motor spring attached at each end to one of said drums and having a run tangential with and between alternate faces of said power and storage drums, and tensioning means coupled to said power and storage drums for applying a torque to rotate one of said drums relative to the other in the direction to produce a tightly wound coil of said motor spring when being wound from the power drum to the storage drum.

2. A coiled spring motor including a pair of substantially parallel shafts provided with power and storage drums respectively secured to one of said shafts, a spiral motor spring attached at each end to one of said drums and having a run tangential with and between alternate faces of said power and storage drums, and tensioning means comprising a tensioning spring secured at one end to one of said shafts, and a rotatable element freely mounted on said one shaft and connected with the other of said shafts for forced rotation therewith, the other end of said spring being secured to said rotatable element, whereby the tensioned spiral coils of said motor spring are tensioned to remain tightly wound on said power and storage drums when being wound from the power drum to the storage drum.

References Cited in the file of this patent

UNITED STATES PATENTS

| | | |
|---|---|---|
| 1,164,489 | Fornelius | Dec. 14, 1915 |
| 2,063,799 | Fornelius | Dec. 8, 1936 |
| 2,622,700 | Geyer | Dec. 23, 1952 |

FOREIGN PATENTS

| | | |
|---|---|---|
| 232,211 | Switzerland | Aug. 1, 1944 |